Sept. 7, 1948.　　　　F. J. PAUL　　　　2,449,007
METHOD AND APPARATUS FOR SEPARATING
PEANUTS FROM DEBRIS
Filed Nov. 2, 1944
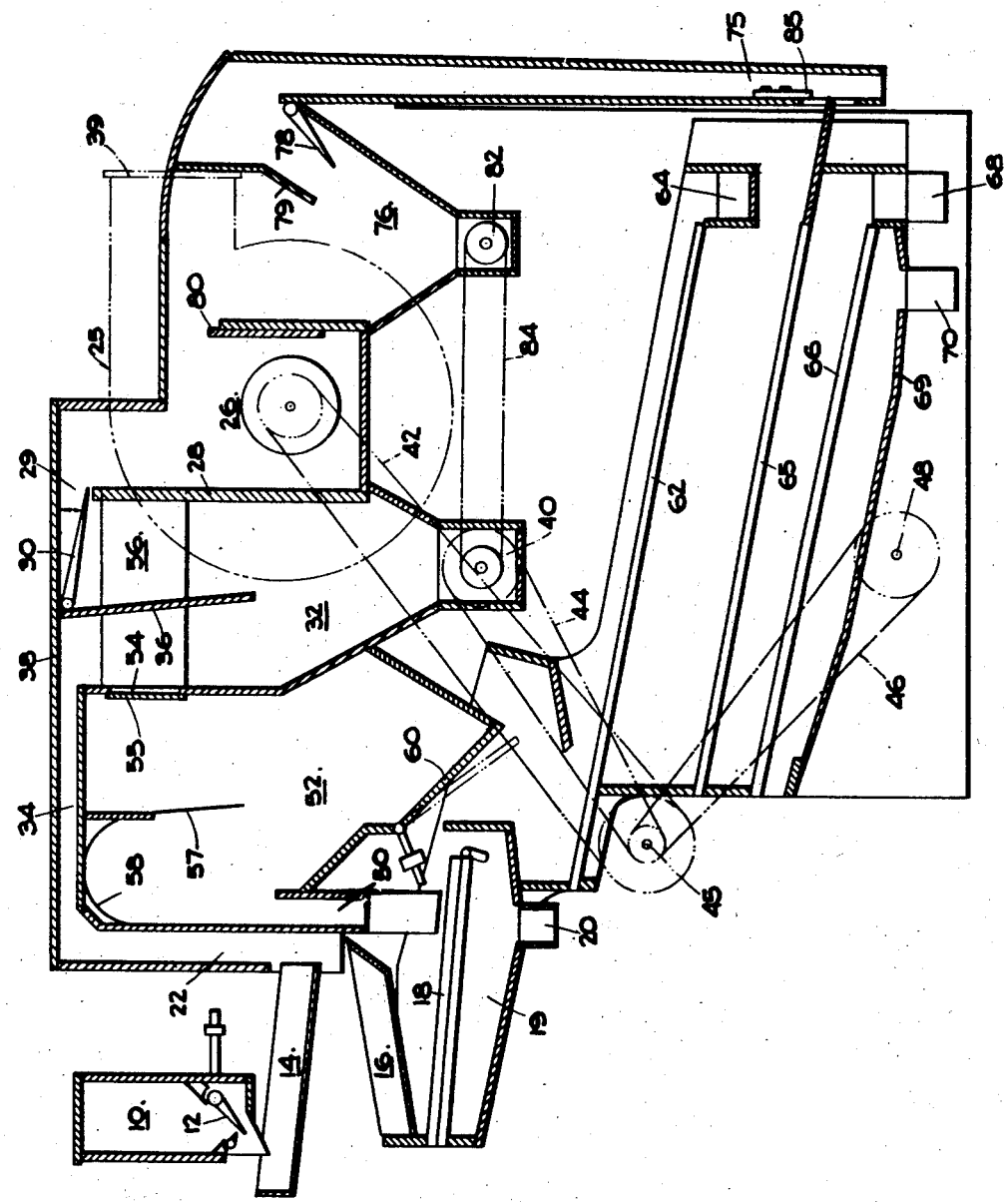
INVENTOR
FREDERICK J. PAUL
BY
Bean, Brooks, Buckley & Bean ATTORNEYS Patented Sept. 7, 1948

2,449,007

UNITED STATES PATENT OFFICE 2,449,007

METHOD AND APPARATUS FOR SEPARATING PEANUTS FROM DEBRIS

Frederick J. Paul, Fredonia, N. Y., assignor to Huntley Manufacturing Company, Brocton, N. Y.

Application November 2, 1944, Serial No. 561,574

6 Claims. (Cl. 202—19)

1

This invention relates to produce handling devices, and more particularly to an improved machine for cleaning and sizing run of the field peanuts-in-hulls.

Raw stock peanuts as harvested from the fields are usually accompanied by stones of approximately the same size and shape as the peanut shells, and if such stones are not removed from the produce they will cause damage to machinery employed for further processing of the nut stock. Also, such field produce invariably includes substantial quantities of relatively light weight broken stock and sticks and hull particles and straw and fine dirt and the like, such as must be removed from the nut stock preliminary to further processing thereof.

It is an object of the present invention to provide an improved machine for the purpose aforesaid, which machine is adapted to handle peanuts as harvested from the field to provide improved cleaning and sizing thereof preliminary to transfer to other equipment for further processing. Another object of the invention is to provide a machine for the purpose aforesaid which is adapted to segregate field stones and dirt and sand and other heavy debris from the produce in improved manner. Other objects and advantages of the invention will appear in the specification hereinafter.

In the drawing Fig. 1 is a diagrammatic vertical section through a machine of the invention.

The drawing illustrates the invention by way of example as applied to a machine which includes a raw material feed hopper 10 into which the field produce is dumped preliminary to performance of the cleaning and sizing operations thereon. An adjustable gage and material feeding device may be employed as indicated at 12 to regulate discharge of produce from the feed hopper 10 upon the upper end of a reciprocating feed pan 14 which is set at such an angle as to feed material at the preferred rate from its lower end upon the upper end of a second reciprocating feeder 16. In the drawing the feeder 16 is reversely directed relative to the feeder 14 so as to reduce the overall length of the apparatus. The upper end of the feeder 16 is spaced below the lower end of the feeder 14 so as to provide for vertical fall of the produce when transferring therebetween, for a purpose which will be explained in detail hereinafter. From the lower end of the feeder 16 the produce falls upon the upper end of a sloping gravity separator 18 which may comprise a screen of vibrating or reciprocating type, as shown and described in U. S. Patent No. 1,109,299, issued September 1, 1914, to T. F. Morse. The apertures of the screen are so sized as to permit relatively fine dirt and sand or the like to pass therethrough, to assist in eliminating such debris from the bulk of the produce.

2

A hopper 19 disposed below the separator 18 catches the sand and heavy debris discharge through the screen and tailing over the lower end for disposal through a spout 20.

An air flue 22 is provided to substantially enclose at its lower end the region of vertical fall of the field produce when transferring from the feed pan 14 to the feeder 16; and the flue 22 is provided with a continuous up-draft of air, by means to be described in detail hereinafter, whereby such up-draft will operate to lift out the field produce the relative light weight refuse materials such as hulls, straw, sticks, dust and the like. The updraft in the flue 22 is provided by means of a fan indicated generally at 25; the intake port of said fan being in open communication with an air chamber 26 having a wall 28 thereof apertured at 29 and fitted with a manually adjustable valve 30 for variable degree communication with a second air or refuse collecting chamber 32. The chamber 32 is formed with a leg 34 extending into open communication with the upper end of the flue 22, and a baffle plate 36 is mounted to extend from the top wall 38 of the chamber 32 downwardly therein so as to partially divide the latter.

The outlet port of the fan 25 is vented to the atmosphere externally of the apparatus, as at 39, and thus it will be understood that upon operation of the fan 25 with the valve 30 in an open position an updraft will be created in the flue 22 such as is adapted to suck straw and dust and light weight debris from the produce discharging from the feed pan 14, for conveyance of such debris through the leg 34 and thence downwardly into the hopper 32. The valve 30 will be preferably adjusted so as to permit the heaviest debris particles of the airstream to settle into the bottom portion of the hopper 32 while the dust-laden air changes its direction of travel and moves upwardly around the baffle 36 and thence past the valve 30 and through the chamber 26 into the fan 25. The debris collecting in the bottom of the hopper 32 is arranged to be continuously removed therefrom by a laterally directed screw conveyor as indicated at 40. Power transmitting belt or chain devices or the like may be employed as indicated at 42—44, respectively, to connect the fan and screw conveyor drive shafts to a common jack-shaft 45 which is in turn operably connected by means 46 to the power shaft 48 of a motor or other suitable power source.

A second air flue 50 is provided to extend at its lower end into close proximity with the layer of produce traveling toward the bottom end of the separator 18; and the upper end of the flue 50 is led into a settling box or hopper 52. A side wall of the box 52 is apertured as at 54 and arranged to be controlled by a slide valve device 55 to provide adjustable communication with a conduit 56 by-passing the separator box 32 and leading into open communication with the fan intake port, so as to provide any preferred degree of suction within the settling box 52. A baffle device 57 partially divides the upper region of the settling box 52. Upon operation of the machine the valve 55 is so set as to provide in the box 52 sufficient suction to lift the nuts from the top of the separator 18 through the flue 50, and a curved top plate 58 in the box 52 directs the nut-laden airstream to flow first upwardly and then over and downwardly for deposit of the nut stock into the bottom of the box 52, while the dust-laden air reverses in direction and flows upwardly again through the valve 55 and into the fan for final discharge.

Thus, the valve 55 may be so regulated as to cause only clean nut stock to be picked up through the flue 50 and deposited into the hopper 52, while relatively heavier stones and other debris will travel on over the end of the separator 18 to be collected in the hopper 19 and discharged through the port 20 thereof. In some instances a small percentage of "pops" and other light weight material may be carried along with the nut stock into the hopper 52; but such refuse will be segregated from the product by operation of other elements of the machine, as will be described hereinafter.

Whenever sufficient quantities of nuts have collected in the hopper 52 an automatic weight-controlled valve bottom plate 60 thereof opens automatically to allow the nuts to feed upon a top sizing screen 62. The automatic valve is preferably so balanced as to open only about three inches for discharge of each batch of nuts, and to be adapted to close while such a quantity of nuts remains in the hopper as will be sufficient to prevent loss of the air lock which is provided by blockage of the valve opening with nut stock. The screen 62 is provided to perform a "scalping" operation; that is, to "scalp" off any material too large to pass through the screen and to deliver such "scalps" to a discharge spout 64 at the end of the screen. The stock passing through the top screen 62 drops upon the main screen 65 which is so selected as to provide the preferred size nuts to tail over at the lower end of the screen while smaller size nuts fall through the screen apertures to be received by a bottom screen 66 for further separation of the stock into batches discharging, respectively, into a chute 68 and upon a pan 69 into a chute 70.

The preferred size stock tailing over the end of the main screen 65 is discharged through a side wall aperture portion of an air flue 75 which is open at its bottom end to permit fall of finally cleaned product therethrough while being in open communication at its upper end with a separator box 76 which is controlled by a valve 78. A partition plate 79 extends downwardly into the upper portion of the box 76, and a valve 80 is provided in conjunction with an apertured side wall portion of the box 76 to provide a regulated degree of communication between the box 76 and the intake port of the fan 25. Thus, suitable regulation of the valves 78—80 will provide proper updraft in the flue 75, whereby to give a desirable final cleaning of the nut stock discharging from the main screen 65. The relatively heavy materials carried by the updraft in the flue 75 will be deposited in the bottom of the hopper 76 while the dust laden air will be carried through the fan for final discharge. A screw conveyor 82 is provided in the bottom of the hopper 76 to be operably connected by power means 84 to the shaft of the conveyor 40 so as to thereby couple all of the operative elements for driving purposes to the same power shaft. Also, the screen actuating cams or other devices are operably connected to the power shaft system so that all elements of the machine will operate simultaneously. A draft control slide 85 is preferably mounted in conjunction with the feed-out aperture in the flue 75 so as to be adapted to be vertically adjustable to provide any preferred degree of air current in the region of the flow of nut stock out of the bottom of the flue 75.

Thus, it will be understood that the machine of the invention provides an unusually comprehensive treatment of field produce for cleaning and sizing and debris-segregating purposes; which system is so adjustable and flexible as to adapt it to operate with optimum results upon a large variety of produce types. For example, whereas in the prior art the principle of pneumatic separation of light refuse from preferred stock has been employed, the machine of the present invention embodies a unique operation in that initially the light refuse is segregated pneumatically from the product; secondarily, the produce is pneumatically segregated from the heavy refuse; and finally, the produce is scalped and sized by agitation methods in combination with additional pneumatic final cleaning of light refuse from the heavier nut stock. The above operative processes are provided in accord with the principles of the invention through use of a simple machine embodying relatively few operative elements, and the major elements of the machine perform multiple functions so as to provide overall an operative unit of maximum mechanical simplicity which is capable of functioning to single-process field produce in such manner as to provide improved cleaning and sizing thereof.

It will of course be appreciated that although only one form of the machine of the invention has been illustrated and described in detail herein, it may take various other forms and various changes may be made therein without departing from the spirit of the invention or the scope of the following claims.

What is claimed is:

1. An apparatus for processing agricultural produce and the like as received from the fields, said apparatus comprising in combination, a power source, a fan coupled to said power source, produce sizing screen means of power-actuated type coupled to said power source, a produce feeder of power-actuated type coupled to said power source and adapted to receive successive batches of field produce and to discharge it in stream form, air flue means in the path of said produce stream and in communication with the air intake port of said fan for lifting debris therefrom, a gravity separator adapted to receive the stream of unlifted produce from said feeder and to segregate said produce into layers including a bottom layer of heavy debris and a top layer of preferred product, a second air flue arranged in communication with the air intake port of said fan and above said produce top layer portion for lifting said preferred product upwardly to a hopper device, feeding means discharging said preferred product from said hopper device onto said sizing screen means for sizing classification of the preferred product, and a third air flue arranged in communication with the air intake port of said fan and having its intake adjacent the path of the preferred sized product from said sizing screen means for lifting light weight debris therefrom.

2. An apparatus for processing nuts and the like as received from the fields, said apparatus comprising in combination, a produce feeder adapted to receive successive batches of field produce and to discharge it in stream form, pneumatic flue means having its intake in the path of said stream of produce for segregating light weight debris therefrom, a first gravity separator adapted to receive the heavy materials of the stream of produce from said feeder and to segregate it into a top layer of preferred product and a bottom layer of heavy debris, a second gravity separator, a second pneumatic flue separate from said first mentioned flue means and arranged above the light weight top layer portion of the produce stream on said first gravity separator for pneumatically segregating said preferred product from the heavy debris layer and delivering the preferred product upwardly and to said second gravity separator, and a third pneumatic flue having its intake adjacent the path of the preferred sized product discharging from said second gravity separator for lifting light weight debris therefrom.

3. An apparatus for processing peanut harvests and the like as received from the fields, said apparatus comprising in combination, a power source, a fan coupled to said power source, produce sizing screen means of power-actuated type coupled to said power source, a produce feeder of power-actuated type coupled to said power source and adapted to receive successive batches of field produce and to discharge therefrom a stream of produce, air-flue means in the path of said stream of produce and extending therefrom initially vertically and thence into operative communication with the air intake port of said fan, and second produce feeder of power-actuated type operatively coupled to said power source and adapted to receive the stream of produce discharge from said first feeder and to discharge said produce therefrom in stream form, a power-actuated inclined shaking table type gravity separator operably connected to said power source and adapted to receive the stream of produce from said second feeder, a second air flue separate from said first mentioned flue means and arranged at one end in communication with the air intake port of said fan and disposed at its other end above the light weight top layer portion of the produce stream travelling over said gravity separator table to deliver said top layer upwardly, said second air flue means including a settling chamber wherein the preferred produce is enabled to settle out of the dust-laden stream of air travelling through said duct into said fan, feeding means for discharging said preferred produce onto said sizing screen means, and a third pneumatic flue having its intake adjacent the path of the preferred sized product discharging from said sizing screen means for lifting light weight debris from the final product.

4. A method of segregating nut produce from both relatively light and heavy weight debris, said method comprising initially pneumatically separating relatively light weight debris from the produce, supporting said produce and heavy debris mixture to travel along a vertically inclined path toward a point of debris discharge therefrom while agitating said product and debris to effect gravity segregation of the mixture to dispose said produce at the top layer portion thereof, and then secondarily pneumatically elevating the top layer produce to separate it from the relatively heavy weight debris prior to arrival of said heavy debris at said point of debris discharge, then gravity separating and sizing said top layer produce, and finally pneumatically elevating light weight debris from the preferred sized produce.

5. An apparatus for sizing and cleaning nut produce from field debris, said apparatus comprising in combination pneumatic draft means for initially separating relatively light weight debris from said produce, means for gravity segregating the produce from the relatively heavy weight debris, pneumatic draft means for lifting the segregated produce from the heavy debris, means for sizing said lifted produce, pneumatic draft means for finally segregating light weight debris from the sized produce, and means for selectively regulating the effective draft intensities of the pneumatically segregating processes.

6. An apparatus for processing agricultural produce and the like as received from the fields, said apparatus comprising in combination, a power source, a fan coupled to said power source, produce sizing screen means of power-actuated type coupled to said power source, a produce feeder of power-actuated type coupled to said power source and adapted to receive successive batches of field produce and to discharge it in stream form, air flue means in the path of said produce stream and extending into communication with the air intake port of said fan, a gravity separator adapted to receive the stream of produce from said feeder and to segregate said produce into layers including a bottom layer of heavy debris and a top layer of preferred product, a second air flue arranged in communication with the air intake port of said fan and above said produce top layer portion for carrying said preferred product to a hopper device, feeding means discharging said preferred product from said hopper device onto said sizing screen means for sizing classification of the preferred product, a third air flue having its intake adjacent the path of the preferred size product as it discharges from said sizing screen means for lifting light weight debris from said product and draft regulating means adapted to selectively control the drafts within said flue means.

FREDERICK J. PAUL.

REFERENCES CITED

The following references are of record in the file of this patent:

UNITED STATES PATENTS

| Number | Name | Date |
| --- | --- | --- |
| 267,389 | White | Nov. 14, 1882 |
| 783,571 | Fricke | Feb. 28, 1905 |
| 853,917 | Clifford | May 14, 1907 |
| 921,374 | Donovan | May 11, 1909 |
| 931,374 | Donovan | May 11, 1909 |
| 1,109,299 | Morse | Sept. 1, 1913 |
| 1,233,965 | Bishop et al. | July 17, 1917 |
| 1,665,756 | Thorbus | Apr. 10, 1928 |
| 1,799,010 | Farris | Mar. 31, 1938 |
| 2,125,207 | Suggs | July 26, 1938 |
| 2,257,552 | Hammack | Sept. 30, 1941 |
| 2,288,814 | Lindsey | July 7, 1942 |